US012326582B2

(12) United States Patent
Sakazume

(10) Patent No.: US 12,326,582 B2
(45) Date of Patent: Jun. 10, 2025

(54) LIGHT SHIELDING MEMBER

(71) Applicant: SOMAR CORPORATION, Chuo-ku Tokyo (JP)

(72) Inventor: Naoki Sakazume, Chuo-ku Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days.

(21) Appl. No.: 18/023,579

(22) PCT Filed: Aug. 30, 2021

(86) PCT No.: PCT/JP2021/031654
§ 371 (c)(1),
(2) Date: Feb. 27, 2023

(87) PCT Pub. No.: WO2022/045319
PCT Pub. Date: Mar. 3, 2022

(65) Prior Publication Data
US 2023/0305197 A1    Sep. 28, 2023

(30) Foreign Application Priority Data

Aug. 31, 2020   (JP) .................................. 2020-146380

(51) Int. Cl.
*G02B 5/00*    (2006.01)

(52) U.S. Cl.
CPC .................... *G02B 5/003* (2013.01)

(58) Field of Classification Search
CPC ........ G02B 5/003; G02B 5/00; G02B 5/0226; G02B 1/10; G02B 5/22; B32B 7/023
See application file for complete search history.

(56) References Cited

U.S. PATENT DOCUMENTS

| 12,055,735 | B2  |    | 8/2024  | Isshiki et al. |            |
|------------|-----|----|---------|----------------|------------|
| 2018/0207907 | A1 | *  | 7/2018  | Okabe          | G02B 5/0226 |
| 2019/0184676 | A1 | *  | 6/2019  | Kamada         | C08G 18/6644 |
| 2019/0235304 | A1 | *  | 8/2019  | Tamada         | G02B 5/0221 |
| 2019/0257981 | A1 |    | 8/2019  | Togawa         |            |
| 2020/0363571 | A1 | *  | 11/2020 | Isshiki        | G02B 5/0294 |
| 2021/0138770 | A1 | *  | 5/2021  | Kamada         | B32B 27/18 |
| 2021/0255364 | A1 | *  | 8/2021  | Yabuta         | H10K 59/8791 |

FOREIGN PATENT DOCUMENTS

| CN | 104898372 A | 9/2015 |
| JP | 2008241767 A | 10/2008 |
| JP | 2010175653 A | 8/2010 |
| JP | 2012171983 A | 9/2012 |
| JP | 2013226748 A | 11/2013 |
| JP | 2019012163 A | 1/2019 |
| JP | 2020064217 A | 4/2020 |
| JP | 2020106605 A | 7/2020 |
| TW | 200847777 A | 12/2008 |
| WO | 2013061990 A1 | 5/2013 |
| WO | 2015133431 A1 | 9/2015 |
| WO | 2018052044 A1 | 9/2018 |
| WO | 2019156076 | 2/2021 |
| WO | 2021176967 A1 | 9/2021 |

OTHER PUBLICATIONS

Examiner provided machine translation of Nagahama et al. (WO 2021/176967, of record) (Year: 2021).*
Examiner provided machine translation of Taniguchi et al. (JP 2008/241767 A, of record) (Year: 2008).*
Japanese Notice of Reasons for Refusal issued Apr. 4, 2023 in Japanese application JP2022545748, 3 pages in Japanese.
Japanese Notice of Reasons for Refusal issued Apr. 4, 2023 in Japanese application JP2022545748, 3 pages in English.
PCT International Search Report mailed Oct. 26, 2021, in corresponding PCT application PCT/JP2021/031654, 2 pages in English.
Korean Notice of Reason for Rejection mailed Mar. 8, 2024 in counterpart Korean application 10-2023-7002233, 3 pages in Korean.
Korean Notice of Reason for Rejection mailed Mar. 8, 2024 in counterpart Korean application 10-2023-7002233, 4 pages in English.
Taiwan Office Action mailed Apr. 3, 2024 in counterpart Taiwan appication TW11320328200, 6 pages in Chinese.
Taiwan Office Action mailed Apr. 3, 2024 in counterpart Taiwan appication TW11320328200, 5 pages in English.
Chinese First Office Action mailed Mar. 23, 2024 in counterpart Chinese application CN202180052930.X, 6 pages in Chinese.
Chinese First Office Action mailed Mar. 23, 2024 in counterpart Chinese application CN202180052930.X, 7 pages in English.
Korean Second Office Action mailed Sep. 3, 2024 in counterpart Korean application KR10-2023-7002233, 5 pages in Korean.
Korean Second Office Action mailed Sep. 3, 2024 in counterpart Korean application KR10-2023-7002233, 6 pages in English.

* cited by examiner

*Primary Examiner* — Balram T Parbadia
(74) *Attorney, Agent, or Firm* — Juan Carlos A. Marquez; Marquez IP Law Office, PLLC

(57) ABSTRACT

A light shielding component with low gloss and high optical concentration independent of the film thickness of the light shielding layer is provided. The light shielding component includes a substrate film; and a light shielding layer formed on at least one surface of the substrate film. The maximum height Rz measured according to JIS B0601:2001 of the surface forming the light shielding layer is set to 1 μm or more and 5 μm or less, and the average length Rsm of the contour curve elements is set to 40 μm or less. Preferably, the light shielding layer includes a particle group with a particle size of 2 μm~6 μm and a particle group with a particle size of 0.06 μm~0.4 μm.

5 Claims, 3 Drawing Sheets

LIGHT SHIELDING MEMBER

FIELD OF TECHNOLOGY

Figure 1:
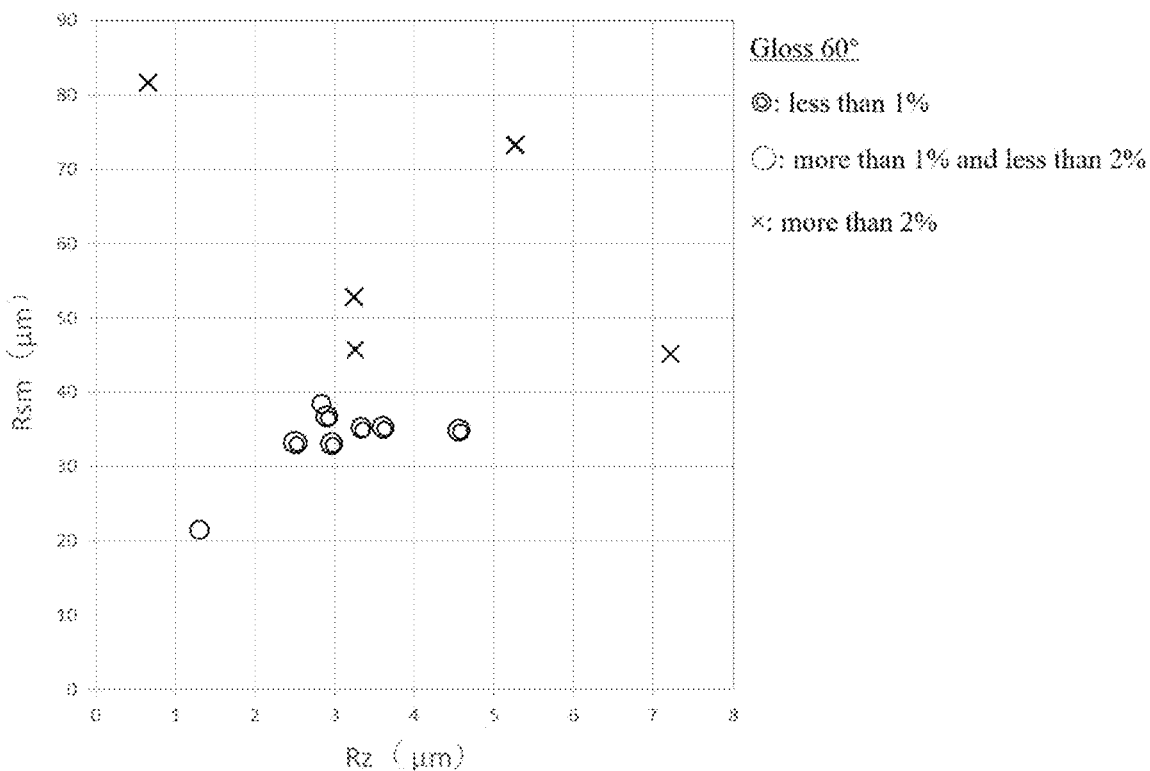
Figure 1:
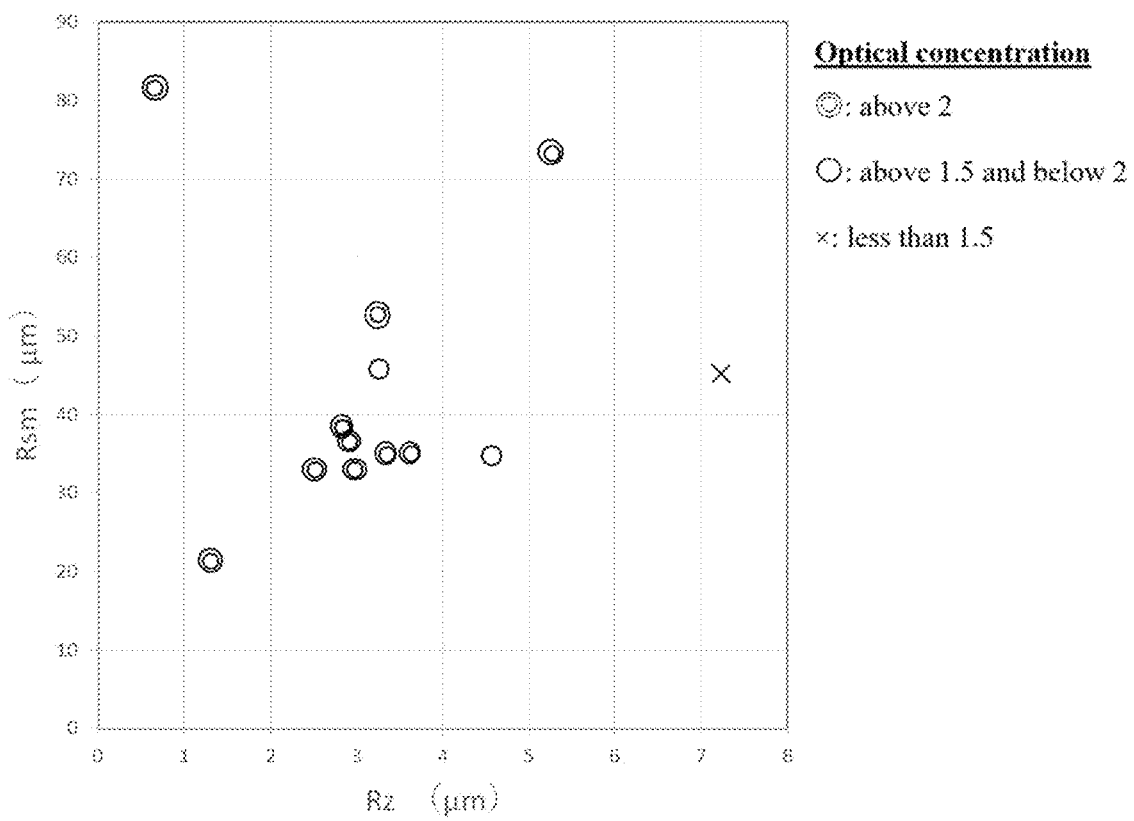
Figure 1:
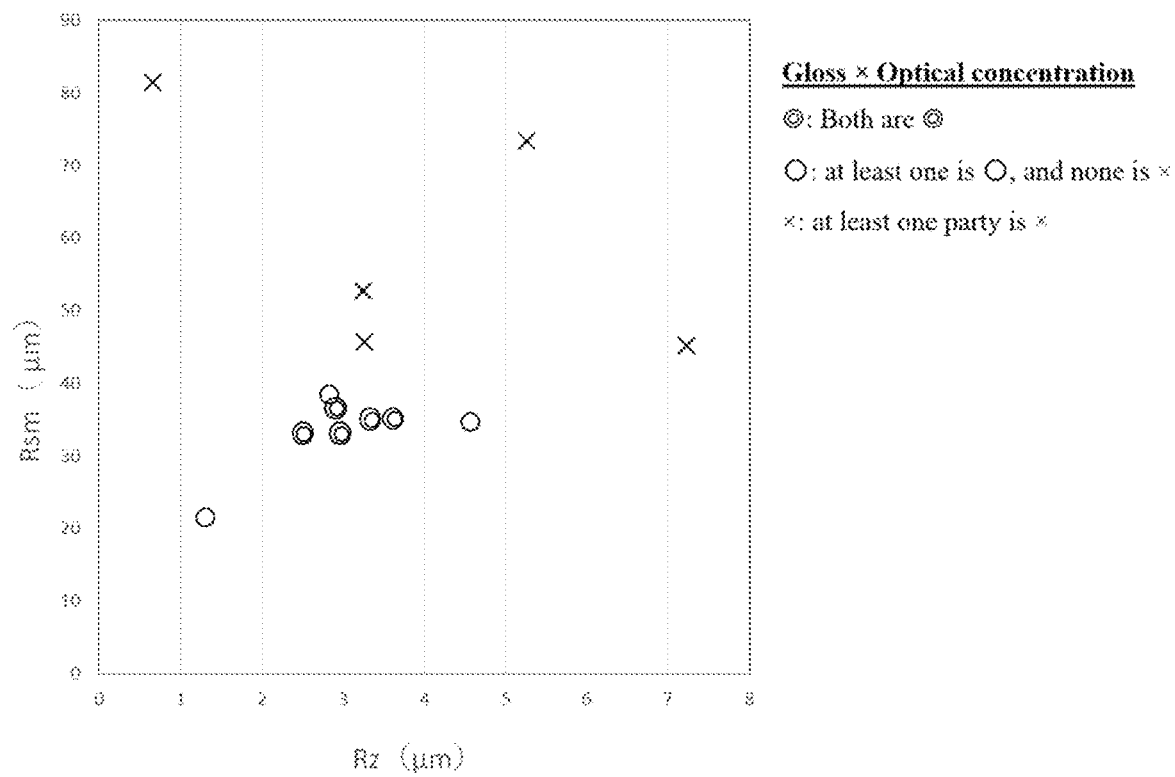
Figure 1:
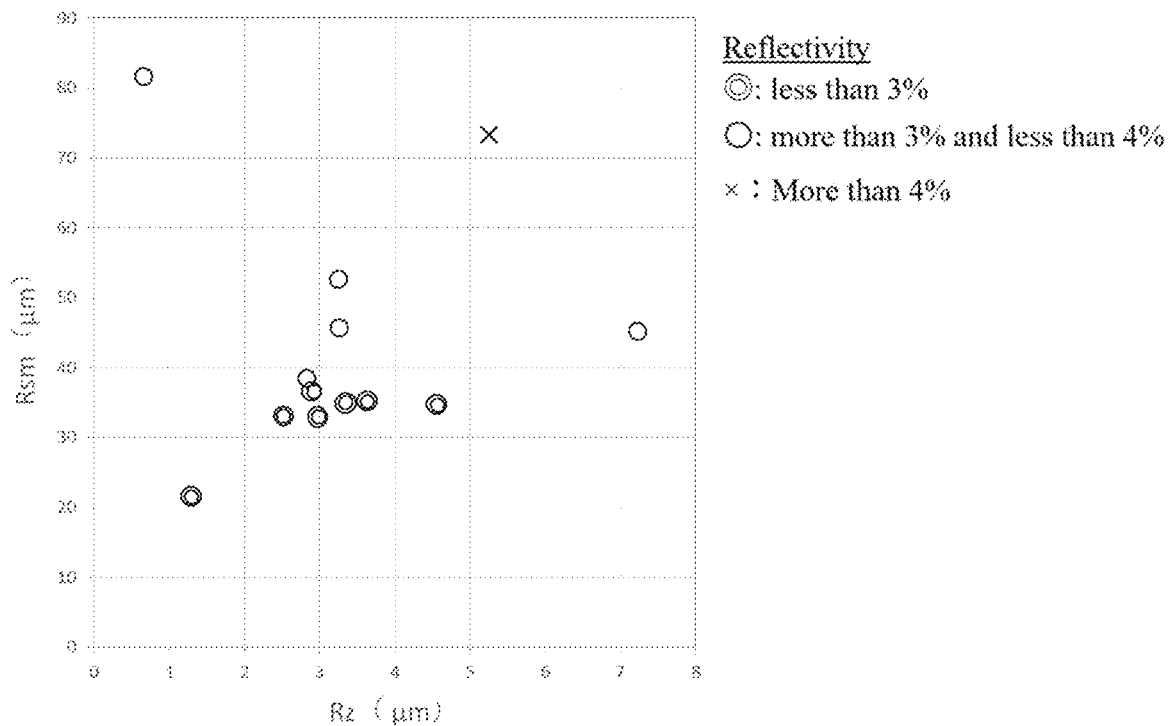
Figure 1:
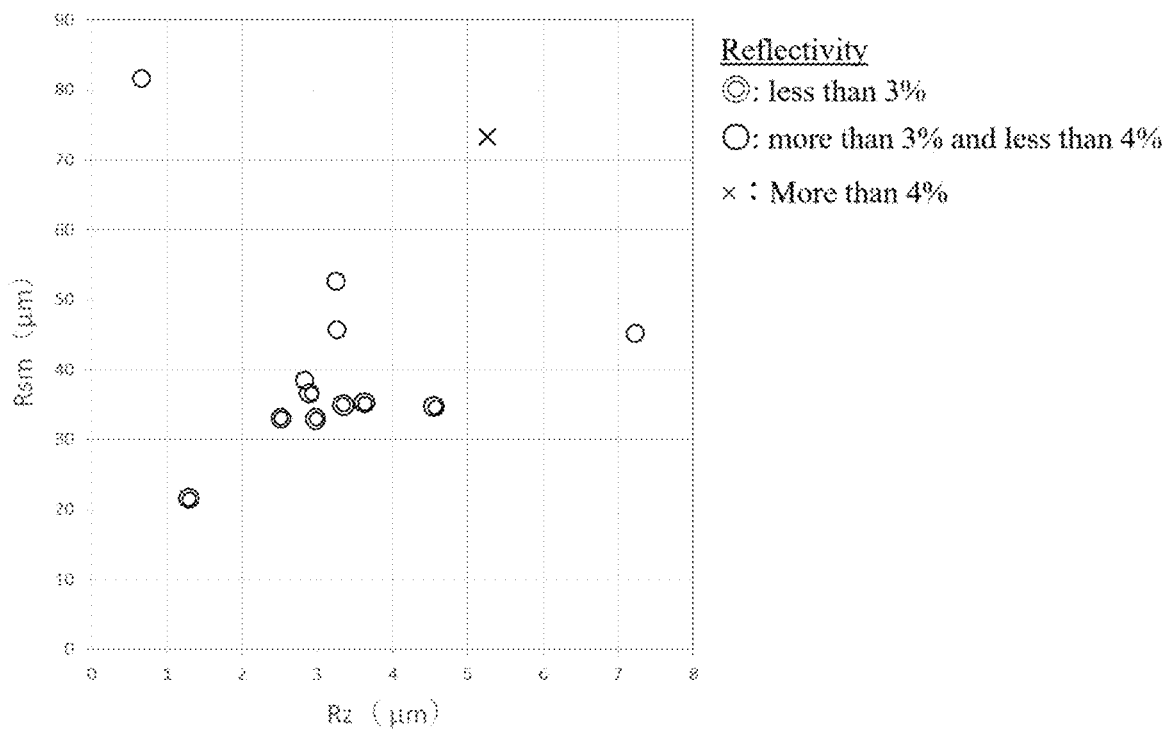
Figure 1:
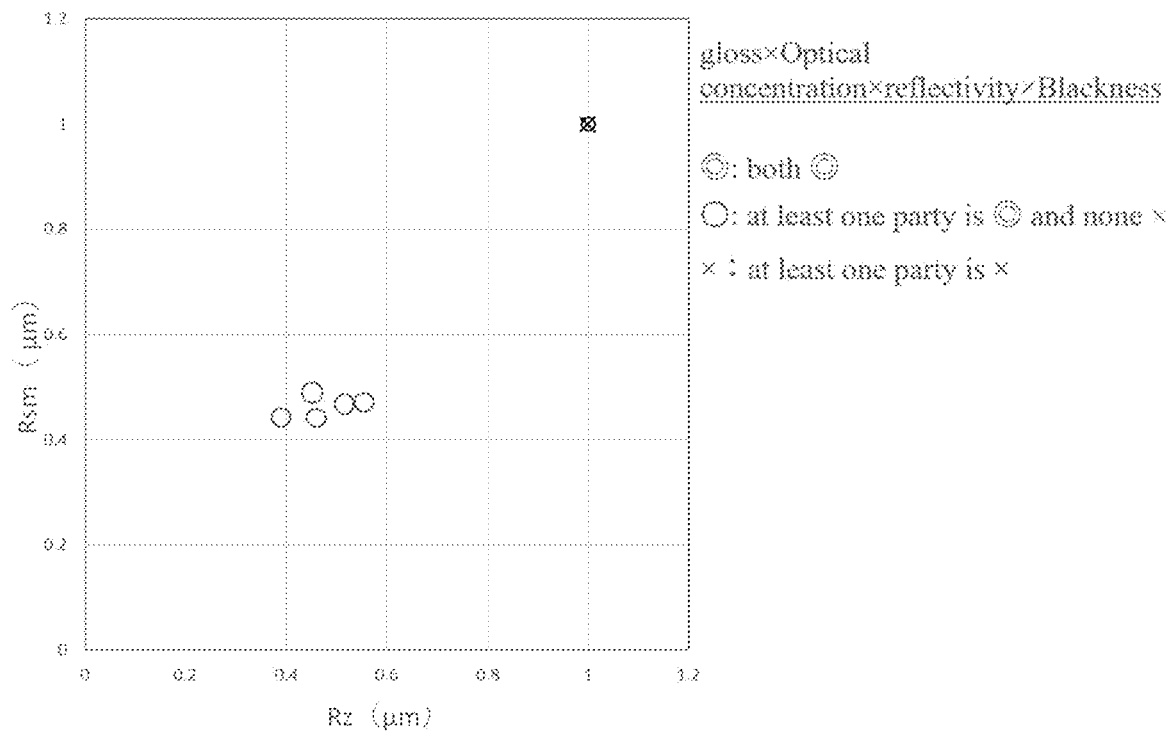

The invention relates to a light shielding component, and in more detail, relates to a light shielding component that can be applied to optical devices such as camera units of mobile phones, etc., including smart phones.

BACKGROUND TECHNOLOGY

Generally, a light shielding component is used in the lens diaphragm, the shutter and the lens spacer of the camera.

As such a light shielding component, it is known that a black film forms a specified concave and convex shape on the surface of a black polyester substrate and so on which containing carbon black or the like. As the method for forming the concave and convex, for example, a method for coating a light shielding layer containing a matting agent on the surface of the substrate and a method for roughening the surface of the substrate by sandblasting or the like.

Patent Document 1: Bulletin of International Disclosure No. WO2018/052044 describes that it is possible to produce a light shielding component by using the above methods, whose arithmetical mean roughness Ra of the surface is 0.5 µm or more according to JIS B0601:2001 and a difference between the maximum peak height Rp and the maximum valley depth Rv (Rp−RV) is less than 3. Moreover, the light shielding component of the Patent Document 1 shows that even if it is thin, it has excellent anti reflection performance, high hardness, and excellent adhesion between the light shielding layer and the film substrate, so it can maintain excellent anti reflection performance for a long time.

SUMMARY OF THE INVENTION

Problems to be Solved by Invention

In recent years, the camera units mounted on smart phones tend to be further miniaturized and the number of lenses assembled be increased. Therefore, it is required that the light shielding component with low gloss and high optical concentration can be realized even if it is thin. However, in the structures of reducing glossiness by setting the surface roughness above the specified value, as in the prior art, the thinning has limitations.

The present invention is completed in view of the above situations, and aims to provide a light shielding component that can achieve low gloss and high optical concentration without depending on the thickness of the light shielding layer. In the present invention, another object is to provide a light shielding component with low reflectivity and high blackness without depending on the thickness of the light shielding layer.

Means for Solving Problems

In view of the above subjects, the inventor of the present invention has carried out in-depth research, and found that in a light shielding component with a substrate film and a light shielding layer with a concave and convex shape that formed on at least one surface of the substrate film, the above problems can be solved by controlling a maximum height Rz (hereinafter, also referred to as "Rz") measured according to JIS B0601:2001 and an average length Rsm (hereinafter, also referred to as "Rsm") of the contour curve elements of the above concave and convex shape within a specified range, thus the invention comes to mind.

That is, the light shielding component of the invention is provided with a substrate film and a light shielding layer formed on at least one surface of the substrate film, which is characterized in that the maximum height Rz measured according to JIS B0601:2001 on the outermost surface forming the surface of the light shielding layer is 1 µm or more and 5 µm or less, and the average length Rsm of the contour curve elements is 40 µm or less.

Preferably, the light shielding layer comprises a plurality of particle groups with different particle sizes.

Preferably, the particle groups include a particle group with a particle size of 2 µm~6 µm and a particle group with a particle size of 0.06 µm~0.4 µm.

In addition, the particle size here is not limited to the average particle size. By observing the light shielding layer with a microscope, it is clear that there are particles in the above ranges, which are also included in the above specified ranges.

Preferably, the particle group with the largest particle size among the particle groups is an inorganic particle group containing inorganic particles.

Preferably, the inorganic particles are silica.

Preferably, the surface of the light shielding component forming the light shielding layer has a glossiness less than 2% for the incident light with an incident angle of 60°, and an optical concentration is 1.5 or more.

Preferably, the L value of the surface of the light shielding component forming the light shielding layer is 22 or less.

Preferably, the surface of the light shielding component forming the light shielding layer has a reflectance for the light with a wavelength of 550 nm is 4% or less.

Preferably, an average film thickness of the light shielding layer is 2 µm or more and 20 µm or less.

The Effects of the Invention

Since the light shielding component of the invention has low glossiness and high optical concentration, it can effectively prevent the ghost/flare phenomenon caused by the diffuse reflection of light, and achieve excellent light shielding performance. In particular, according to the light shielding layer of the invention, even if thin-film processing is carried out, it can achieve a lower gloss property that is more excellent than the existing light shielding layer of the thick film, so it can also adapt to the miniaturization/high-performance of the camera unit. In addition, in the light shielding component of the present invention, the ghost/flare phenomenon can be more effectively prevented by reducing the reflectivity. Further, by improving the blackness of the light shielding component of the invention, and the black color is conspicuous, so that the design can be improved, and suitable for use as a camera unit for mobile phones such as smart phones.

BRIEF DESCRIPTION OF ATTACHED DRAWINGS

FIG. 1 (*a*) shows the results obtained by evaluating the glossiness of various light shielding components with different maximum height Rz and average length Rsm of the contour curve elements.

FIG. 1 (*b*) shows the results obtained by evaluating the optical concentration of various light shielding components with different maximum height Rz and average length Rsm of the contour curve elements.

FIG. 1 (c) shows the results obtained by evaluating the glossiness and optical concentration of various light shielding components with different maximum height Rz and average length Rsm of the contour curve elements.

FIG. 1 (d) shows the results obtained by evaluating the reflectivity of various light shielding components with different maximum height Rz and average length Rsm of the contour curve elements.

FIG. 1 (e) shows the results obtained by evaluating the blackness of various light shielding components with different maximum height Rz and average length Rsm of the contour curve elements.

FIG. 1 (f) shows the results obtained by evaluating the glossiness, optical concentration, reflectivity and blackness of various light shielding components with different maximum height Rz and average length Rsm of the contour curve elements.

SPECIFIC EMBODIMENTS

The embodiments of the present invention will be described in detail below.

In addition, in this specification, "~" indicating the range of values indicates the range containing the values recorded as the upper limit value and the lower limit value, respectively. In addition, in the range of values, if the unit is only recorded for the upper limit value, it means that the unit of the lower limit value is also the same as the upper limit value.

In the range of values recorded gradually in this specification, the upper limit value or the lower limit value of a certain range of values can also be replaced by the upper limit value or lower limit value of other range of values recorded gradually.

In addition, in the range of values recorded in this specification, the upper limit value or the lower limit value recorded in a certain range of values can also be replaced by the values shown in the examples.

In this specification, with respect to the percentage or content of each constituent in a composition, if there is a variety of substances equivalent to each component in the composition, as long as there is no special description, it refers to the total percentage or total content of the various substances in the composition.

The light shielding component of the invention is provided with a substrate film and a light shielding layer formed on at least one surface of the substrate film, which is characterized in that the maximum height Rz measured according to JIS B0601:2001 on the outermost surface of the surface forming the light shielding layer is 1 μm or more and 5 μm or less, and the average length Rsm of the contour curve elements is 40 μm or less.

As mentioned above, in the prior art, low gloss is achieved by controlling the depth direction of the concave and convex shapes of the surface of the light shielding component. That is, the glossiness of the light shielding component is reduced by controlling the height of the peaks and the depth of the valleys of the concave and convex shapes formed on the surface of the light shielding component. Such a structure is effective in the light shielding component with a specified thickness of the light shielding layer, but it is difficult to cope with the further thinning of the light shielding layer and the light shielding component.

Therefore, the inventor of the invention has made in-depth research, and found that the low gloss and high optical concentration can be achieved independent of the film thickness of the light shielding layer by controlling the depth direction and the horizontal direction of the concave and convex shapes of the surface of the light shielding component, thus the invention is completed. That is, the inventor of the invention has made it clear that: by setting the roughness of the concave and convex shapes (in the depth direction) of the surface of the light shielding component as a specified range, and adjusting the distance between the adjacent peaks of the concave and convex shapes in the horizontal direction and the distance between the valleys to be below the specified value, the light shielding component with low gloss and high optical concentration is obtained, which does not depend on the film thickness of the light shielding layer. It is confirmed in the present invention that even if the light shielding layer is further thin-film compared with the existing light shielding component, it is possible to achieve a lower glossiness than the existing light shielding component. In addition, in the light shielding component of the present invention, low reflectivity and high blackness can be achieved.

FIG. 1(a) shows the results obtained by evaluating the glossiness of the light shielding component with film thicknesses of the light shielding layer less than 6 μm and different Rz and Rsm produced by various methods using the later method for the incident light with an incident angle of 60°. In addition, glossiness is revealed based on the following evaluation standard.

(Evaluation Standard of Glossiness)
- ⊚: less than 1% (very excellent)
- ○: 1% or more and less than 2% (excellent)
- x: 2% or more (does not meet the requirements of the invention)

In addition, FIG. 1(b) shows that the results obtained by evaluating the optical concentration of the light shielding component with film thicknesses of the light shielding layer less than 6 μm and different Rz and Rsm produced similarly using the later method. In addition, the optical concentration is revealed based on the following evaluation standard.

(Evaluation Standard of Optical Concentration)
- ⊚: 2 or more (excellent)
- ○: 1.5 or more and less than 2 (good)
- x: Less than 1.5 (does not meet the requirements of the invention)

FIG. 1(c) shows that the results obtained by evaluating comprehensively the above glossiness and optical concentration based on the following standards.
- ⊚: The evaluation standards of glossiness and optical concentration are 502
- ○: At least one of the evaluation standards of glossiness and optical concentration is ○ and neither is x
- x: At least one of the evaluation standards of glossiness and optical concentration is x FIG. 1(d) shows that the results obtained by evaluating the reflectivity of the light shielding component with film thicknesses of the light shielding layer less than 6 μm and different Rz and Rsm produced similarly using the later method for the light with a wavelength of 550 nm. In addition, the reflectivity is revealed based on the following evaluation standard.

(Evaluation Standard of Reflectivity)
- ⊚: 3% or less (excellent)
- ○: More than 3% and 4% or less (good)
- x: More than 4% (does not meet the requirements of the invention)

FIG. 1(e) shows that the results obtained by evaluating the blackness (L value) of the light shielding component with film thicknesses of the light shielding layer less than 6 μm and different Rz and Rsm produced similarly using the later method. In addition, the blackness is revealed based on the following evaluation standard.
(Evaluation Standard of Blackness)
⊚: 18 or less (very excellent)
◯: More than 18 and 22 or less (excellent)
x: More than 22 (does not meet the requirements of the invention)

In addition, FIG. 1(f) shows the results obtained by evaluating comprehensively the above glossiness, optical concentration, reflectivity and blackness based on the following standards.
⊚: The evaluation standards of glossiness, optical concentration, reflectivity and blackness are ⊚
◯: At least one of the evaluation standards of glossiness, optical concentration, reflectivity and blackness is ◯ and none is x
x: At least one of the evaluation standards of glossiness, optical concentration, reflectivity and blackness is x It can be seen from FIG. 1(a) that when Rz is 1 μm or more and 5 μm or less, and Rsm is 40 μm or less, the glossiness is less than 2 (the measured value is less than 1.5), and low glossiness is obtained.

In addition, it can be seen from FIG. 1(b) that a good optical concentration is obtained in the above range. It can be seen from FIG. 1(c) that when Rz is 1 μm or more and 5 μm or less, and Rsm is 40 μm or less, even if the light shielding layers with film thickness less than 6 μm, it can also achieve low gloss and high optical concentration.

In addition, it can be seen from FIG. 1(d) that low reflectivity is obtained in the above range. Further, it can be seen from FIG. 1(e) that high blackness is obtained in the above range. This is confirmed by FIG. 1 (f) that when Rz is 1 μm or more and 5 μm or less, and Rsm is 40 μm or less, even if the light shielding layers with film thickness less than 6 μm, it can also achieve low gloss, high optical concentration, low reflectivity and high blackness.

The light shielding component of the present invention is characterized in that the roughness of the concave and convex surface of the light shielding layer is set to be lower, and the distance between adjacent peaks and between valleys is set to be shorter. In this way, through the concave and convex shapes of the structure with short distances between peaks and between valleys, the incident light is reflected repeatedly more times, and it is easy to absorb light through the concave and convex surface. Therefore, it is considered that low gloss and high optical concentration can be achieved through the light shielding component of the present invention, while achieving low reflectivity and high blackness.

The inventor of the present invention has found that by making the light shielding layer contain a variety of particle groups with different sizes, it is easy to set Rz and Rsm to the above ranges, which can achieve low gloss and high optical concentration, while achieving low reflectivity and high blackness.

The preferred structures of the light shielding component of the present invention will be described below.

Generally, the light shielding component has the following structures: a light shielding layer containing a matrix part and particles is coated on the surface of the substrate film. In the previous light shielding components, the roughness of the concave and convex shapes is controlled above the specified value to achieve low gloss, so the relatively coarse particles are dispersed in the matrix part.

In contrast, in the light shielding component of the present invention, it is preferable to use a particle group with larger particle sizes and a particle group with smaller particle sizes.

In the above structures, particles with smaller particle sizes enter between particles with larger particle sizes, and shallow concave and convex shapes with shorter distance between grooves are easily formed on the surface of the light shielding layer, so that the Rz and Rsm on the surface of the light shielding layer of the light shielding component can be appropriately controlled within the specified ranges of the invention. In this way, on the surface of the light shielding layer of the invention, where the distance between peaks and the distance between valleys is short, the reflection times of the incident light are more, and the light is absorbed through the surface of the light shielding layer, so that low gloss and high optical concentration are achieved, and further low reflectivity and high blackness are easily obtained.

In addition, in the above structures of the invention, there are a large number of particles with smaller particle sizes on the concave and convex surface of the light shielding layer. Therefore, it is considered that the excellent low gloss can be achieved by making the light incident on the peak slope and valley (concave) of the surface of the light shielding layer diffuse and reflect on the surface of particles with smaller particle sizes and change the direction of travel in various directions, so as to reach the surface of other particles with smaller particle sizes, repeatedly diffuse and reflect, and absorb light. Moreover, since particles with smaller particle sizes protrude from the surface of the concave and convex shapes, the surface of the light shielding layer becomes more complex concave and convex shapes, so the glossiness can be further reduced through diffusion and reflection, and the low gloss that is difficult to achieve in the prior art can be achieved.

The details of particles added to the light shielding layer of the present invention will be described later.

The Rz value and Rsm value of the surface of the light shielding component can be controlled by adjusting the particle sizes, particle size distribution, content of the combined particle groups and the film thickness of the light shielding layer. In addition, it can also be controlled by adjusting the type of solvent, the concentration of solid components when making the coating solution, and the amount of coating to the substrate film. Furthermore, the coating film manufacturing conditions can be used to control, for example, the coating method of the coating solution, drying temperature, drying time, air volume during drying and so on.

The specific material structures of the light shielding component of the present invention will be described below.
(1) Substrate Film The substrate film used in the invention is not specifically limited, and can be transparent or opaque. As the substrate film material of the invention, the resin, metal, glass and so on can be used.

As the substrate film made of resin, for example, polyolefin such as polyethylene, polypropylene, ethylene propylene copolymer, copolymer of ethylene and α-olefin with the carbon atom number of 4 or more; polyester such as polyethylene terephthalate; polyamide such as nylon; other general plastic films such as ethylene vinyl acetate copolymer, PVC, and polyvinyl acetate; other engineering plastic films such as polycarbonate, polyimide.

In addition, as the substrate film made of metal, for example, the metal sheets used metal such as gold, silver, copper, aluminum, titanium, zinc, beryllium, nickel, tin; alloy sheets used alloys such as phosphor bronze, copper nickel, copper beryllium, stainless steel, brass, duralumin.

As the substrate film made of glass, there is no special limit, but ultra-thin plate glass (G-Leaf (registered trademark), manufactured by Nippon Electric Glass Co., LTD), etc. can be used, for example.

Among these raw materials, polyethylene terephthalate obtained by biaxial rolling is preferred from the point of view of high strength, economy and versatility, polyimide film is preferred from the point of view of heat resistance, and copper coated metal sheet is preferred from the point of view of higher heat resistance. In the case of using the substrate film made of resin, black colorants such as carbon black and aniline black are mixed in advance, and the optical concentration is set to be 2 or more, preferably high light shielding with 4, or more so that a better light shielding effect can be obtained.

There is no special limit on the thickness of the substrate film, but in the case of using the substrate film made of resin, it is preferably 1 to 250 µm, more preferably 3 to 100 µm, further, it is most preferably 5 to 50 µm. The light shielding component of the invention can achieve low gloss and high optical concentration even if thin-film is applied, so it can also be applied to particularly small and thin optical components. For example, in the case of optical devices such as camera units used for mobile phones and the like, the thickness of the substrate film is preferably 3 to 50 µm, further preferably 5 to 20 µm.

In addition, in the case of using the substrate film made of metal, the thickness is preferably 6 to 30 µm, in particular, in the case of optical devices such as camera units used for mobile phones and the like, it is preferably set as 10 to 20 µm.

For the substrate film, a flat substrate film can be used, or the surface of the substrate film can be subject to matting to form a concave and convex (roughening parts). Through the matting process, it is possible to control the Rz value and Rsm value of the surface of the light shielding component after the light shielding layer is coated, and also to improve the adhesion between the substrate film and the light shielding layer. There is no special limit for the matting process method, and the publicly-known method can be used.

For example, in the case of the substrate film made of resin, chemical etching method, blasting method, embossing method, calendering method, corona discharge method, plasma discharge method, chemical extinction (mat) method using resin and roughening forming agent can be used. In addition, the substrate film directly contains a matting agent, which can also form a concave and convex on the surface of the substrate film made of resin. In the above processing methods, from the point of view of ease of shape control, economy and operability, blasting method is preferred, especially sandblasting method.

In the sandblasting method, the surface properties can be controlled by the particle sizes of the abrasive used, spraying pressure, etc. In addition, in the embossing method, the surface properties can be controlled by adjusting the shape of the embossing roller and pressure.

On the other hand, in the case of the substrate film made of metal, it can be blackened, sandblasted, etched and so on to form a concave and convex surface.

(2) Anchoring Layer

Before the light shielding layer is arranged on at least one surface of the substrate film, the anchoring layer can also be arranged to improve the adhesion between the substrate film and the light shielding layer. As the anchoring layer, urea resin layer, melamine resin layer, polyurethane resin layer, polyester resin and so on can be used. For example, the polyurethane resin layer can be obtained by coating a solution containing a compound of active hydrogen such as diamine and diol, and polyisocyanate on the surface of the substrate film and curing. In addition, when urea resin and melamine resin are applied, it can be obtained by coating a solution containing water-soluble urea resin or water-soluble melamine resin on the surface of the substrate and curing. Polyester resin can be obtained by coating the solution obtained by dissolving or diluting with organic solvent (methyl ethyl ketone, toluene, etc.) on the surface of the substrate and drying it.

(3) Light Shielding Layer

The light shielding component of the invention is characterized in that it has a light shielding layer formed on at least one surface of the substrate film. Moreover, the Rz of the surface forming the face of the light shielding layer is 1 µm or more and 5 µm or less, and the Rsm is 40 µm or less. Here, if the light shielding layer is exposed from the outermost surface, the Rz and Rsm on the surface of the light shielding layer are within the above ranges. If the light shielding layer is coated with a resin film layer, a blackened layer, etc., the Rz and Rsm on the surface of these layers, namely the outermost surface of the light shielding component, are within the above ranges. Hereinafter, these surfaces are collectively referred to as "the outermost surface of the light shielding layer".

As described above, the light shielding component of the invention is characterized in that the Rz on the outermost surface of the light shielding layer is 1 µm or more and 5 µm or less, and the Rsm is 40 µm or less. By controlling the Rz and Rsm on the surface of the light shielding layer to the above ranges, low gloss and high optical concentration can be achieved independent of the film thickness of the light shielding layer. In particular, in the invention, even when the light shielding layer is set to a film 6 µm or less, it also has a remarkable effect, that is, it can achieve better low gloss than the existing the light shielding layer of thick film. Furthermore, low reflectivity and high blackness can be achieved by using the light shielding layer of the present invention.

The lower limit value of Rz is preferably set to 2 µm or more. By setting the lower limit value of Rz to the above value, it is easier to adjust the low gloss, low reflectivity and high optical concentration.

The upper limit value of Rz is preferably set to 5 µm or less and 4 µm or less. By setting the upper limit value of Rz to the above value, it is possible to further achieve low gloss, high optical concentration, low reflectivity and high blackness independent of the film thickness of the light shielding layer.

The lower limit value of Rsm is not specially limited, but it is preferably set to 10 µm or more. Through the above range, more excellent tightness between the substrate and the light shielding layer can be obtained.

In addition, the arithmetic mean roughness Ra measured according to JIS B0601:2001 on the outermost surface of the light shielding layer is preferably 0.6 µm or less, more preferably 0.55 µm or less, further preferably 0.5 µm. or less As a component of the light shielding layer, the light shielding layer may comprise resin component, particles, and colorant/conductive agent.

The resin composition becomes a binder for particles and colorants/conductive agents. There is no special limit on the material of resin composition, and either thermoplastic resin or thermosetting resin can also be used. As the specific thermosetting resins, for example, acrylic resin, polyurethane resin, phenolic resin, melamine resin, urea resin, diallyl phthalate resin, unsaturated polyester resin, epoxy resin, alkyd resin, etc. In addition, as the thermoplastic resin, for example, polyacrylate resin, polyvinyl chloride resin, butyraldehyde resin, styrene butadiene copolymer resin, etc. From the point of view of heat resistance, moisture resistance, solvent resistance and surface hardness, the thermosetting resin is preferred. As the thermosetting resin, the acrylic resin is particularly preferred if the flexibility and the strength and toughness of the film are considered.

By adding curing agent as composition of the light shielding layer, the crosslinking of the resin composition can be promoted. As curing agent, functional groups of urea compound, melamine compound, isocyanate compound, epoxy compound, azacyclopropane compound, oxazoline compound and so on can be used. Among them, isocyanate compounds are particularly preferred. The mixing ratio of the curing agent is preferably 10 to 50 mass % relative to 100 mass % of the resin composition. By adding curing agent in the above range, a light shielding layer with more appropriate hardness can be obtained, even in the case of sliding with other components, the surface properties of the light shielding layer can be maintained for a long time, with low gloss, high optical concentration, low reflectivity and high blackness.

When curing agent is used, reaction catalyst can also be used at the same time to promote the reaction. As the reaction catalyst, for example, ammonia, ammonium chloride, etc. The mixing ratio of the reaction catalyst is preferably 0.1 to 10 mass % relative to 100 mass % of the curing agent.

The light shielding layer of the invention can be made to contain particles and colorants/conductive agents. The inventor of the invention has found that by using more than two particle groups with different particle sizes and particle size distribution as particles and colorant/conductive agent, the Rz and Rsm on the surface of the light shielding layer can be appropriately controlled within the specified ranges of the invention.

For example, when two particle groups with different sizes are used, it is preferable that the particle size of the larger particle group is 10 to 40 times that of the smaller particle group. In addition, when three or more particle groups are used, it is sufficient to adjust so that the particle size of the largest particle group and the particle size of the smallest particle group become the above relationship.

Next, set the larger particle group as large particle 1, and set the smaller particle group as small particle 2 for illustration.

In the invention, as a particle group, it is preferred to include large particle 1 with an average particle size of 2 μm~6 μm and small particle 2 with an average particle size of 0.06 μm~0.4 μm. The average particle size of large particle 1 is more preferably 3 μm~5 μm, further preferably 3 μm~4 μm. The average particle size of small particle 2 is preferably 0.06 μm~0.4 μm, more preferably 0.1 μm~0.3 μm.

By combining such a large particle 1 and a small particle 2, it is possible to bury the small particles 2 between the large particles 1 in the concave, and more appropriately control the values of Rz and Rsm within the specified range of the invention.

The content of particles is determined by the average particle size and particle size distribution of the particle groups, the film thickness of the light shielding layer, and the surface shape of the substrate, but it is preferred to be 20% to 50% by volume relative to 100% by volume of the light shielding layer as a whole. In addition, as long as the values of Rz and Rsm can be adjusted to the above ranges, there is no special limit on the mixing ratio of large particles 1 and small particles 2, but it is preferably 1.5:1 to 3.5:1 (the volume occupied by large particles 1: the volume occupied by small particles 2).

In addition, the volume fraction (volume occupancy) of particles in the light shielding layer can be calculated by converting it into the area occupancy, which is calculated by image analysis and so on based on the sectional photos of the light shielding layer.

As the large particle 1, any of the resin particles and inorganic particles can also be used. As the resin particles, for example, melamine resin, benzoguanidine resin, benzoguanidine/melamine/formalin condensate, acrylic resin, polyurethane resin, styrene resin, fluorine resin, silicon resin, etc. On the other hand, as the inorganic particles, for example, silica, alumina, calcium carbonate, barium sulfate, titanium dioxide, carbon, etc. These can be used alone or in combination.

In order to obtain more excellent properties, the large particle 1 preferably uses inorganic particles. By using inorganic particles as large particles 1, a light shielding component with lower gloss and high optical concentration can be obtained. As the inorganic particles used as large particle 1, silica is preferred. There is no special limit on the shape of large particle 1, but in order to control the Rz and Rsm to the above ranges, it is preferred to use particle groups with sharp particle size distribution. By using such particle groups, it can make more contacts between particles and reduce the Rz and Rsm values.

In addition, in order to further reduce the glossiness, undefined shape particle groups are preferably used. Among them, porous undefined shape silica particles are particularly preferred. By using such particle groups, the light can be refracted repeatedly on the surface and inside of the large particle 1, thus further reducing the glossiness.

In order to suppress the reflection of light, large particle 1 can also be colored black by organic or inorganic colorants. As materials colored in this way, composite silica, for example, composite silica, conductive silica, black silica, etc.

As the composite silica, for example, composite silica obtained by synthesizing and compounding carbon black and silica at the nanometer level, as the conductive silica, for example, conductive silica obtained by coating conductive particles such as carbon black on silica particles, and as the black silica, for example, natural ores containing graphite in silica.

On the other hand, there is no special limit on the material of small particle 2, and any of resin particles and inorganic particles can also be used. As the resin particles, for example, melamine resin, benzoguanidine resin, benzoguanidine/melamine/formalin condensate, acrylic resin, polyurethane resin, styrene resin, fluorine resin, silicon resin, etc. On the other hand, as the inorganic particles, for example, silica, alumina, calcium carbonate, barium sulfate, titanium dioxide, carbon, etc. These can be used alone or in combination.

As the small particle 2, carbon black added as a colorant/conductive agent, for example, can also be used. As the small particle 2, the light shielding layer is colored by using carbon black, so that the anti-reflection effect can be further improved, and a good anti-static effect can be obtained.

In the invention, as the compositions of the light shielding layer, leveling agent, thickener, pH regulator, lubricant, dispersant, defoamer, etc. can be further added as required.

By adding the above structural compositions in organic solvent or water, and mixing and stirring, a uniform coating solution is prepared. As an organic solvent, such as methyl ethyl ketone, toluene, propylene glycol monomethyl ether acetate, ethyl acetate, butyl acetate, methanol, ethanol, isopropanol, butanol, etc. can be used.

The light shielding layer is formed by directly coating the obtained coating solution on the surface of the substrate film or on the preformed anchoring layer and drying it. There are no special limits on coating methods, roller coating, scraper coating, mold coating, stick coating, immersion coating, contact coating, spraying, spin coating, etc. can be used.

The thickness of the light shielding layer of the light shielding component of the invention is not specially limited, but it is preferred that the average film thickness is 2 μm or more and 20 μm or less. In addition, the upper limit of the average film thickness of the light shielding layer of the light shielding component of the invention is more preferably 15 μm, further preferably 10 μm. In the invention, even if the thickness of the light shielding layer is set to 5 μm or less, the light shielding component with low gloss, high optical concentration, low reflectivity and high blackness can also be obtained.

In addition, the average film thickness of the light shielding layer refers to the height of the part protruding from the surface of the film substrate to the light shielding layer due to large particle 1 and small particle 2. The average film thickness of the above light shielding layer can be measured according to JIS K7130.

Hereinafter, the characteristics of the light shielding component of the present invention will be described.
(1) Glossiness The surface of the light shielding component of the invention forming the light shielding layer has a glossiness less than 2% for the incident light with an incident angle of 60°, more preferably less than 1.5%, and further preferably less than 1%. By adjusting the glossiness of the light shielding component of the invention for the incident light with the incidence angle of 60° to the above range, it is possible to effectively prevent the ghost/flare phenomenon caused by the diffuse reflection of light.

The above glossiness is obtained by measuring the specular glossiness relative to the incidence angle of 60° according to JIS Z8741.
(2) Optical Concentration The optical concentration of the surface on which the light shielding layer is formed of the light shielding component of the invention is preferably 1.5 or more, more preferably 2 or more, and further preferably 2.5 or more. The light shielding property can be further improved by adjusting the optical concentration of the light shielding component of the invention to the above range.

The above optical concentration is measured using an X-rite 361T (orthogonal filter) optical densitometer.
(3) Reflectivity The reflectivity of the surface on which the light shielding layer is formed of the light shielding component of the invention to the light with a wavelength of 550 nm is preferably 1 4% or less, more preferably 3% or less, and further preferably 2.5% or less. By adjusting the reflectivity of the light shielding component of the invention to the above range, it is possible to further effectively prevent the ghost/flare phenomenon caused by the diffuse reflection of light.

The reflectivity above is measured with a spectrophotometer CM-5 made by Konica Minolta Co., Ltd.
(4) Blackness The L value of the surface on which the light shielding layer is formed of the light shielding component of the invention is preferably 22 or less, more preferably 20 or less, and further preferably 18 or less. By adjusting the L value of the light shielding component of the invention to the above range, the black color is high, conspicuous, and excellent in design, so that it can be used as a camera unit for mobile phones such as smart phones.

The L value refers to L* value representing lightness in L*a*b* color space estimated based on JIS Z8781-4.

EXAMPLES

The invention is further described in detail through the following examples, but the invention is not limited to these examples. In addition, in the examples, "%" and "portion" represent % by mass and the portion of mass, respectively, without special reference or notation.
⟨Composition of Light Shielding Component⟩
 (1) Substrate film
 (1-1) Polyimide film: KAPTON 50MBC (thickness: 12 μm), manufactured by Toray DuPont
 (2) Light shielding layer
 (a) Particle 1
 (a1) Composite silica: BECSIA ID (average particle size: 3 μm) manufactured by Fuji Silysia Chemical LTD.
 (a2) Transparent silica: ACEMATT R972 inorganic material (average particle size: 58 nm), manufactured by EVONIK
 (a3) Transparent silica: SYLYSIA 430 (average particle size: 4.1 μm), manufactured by Fuji Silysia Chemical LTD.
 (a4) Transparent silica: ACEMATT OK412 (average particle size: 6.3 μm), manufactured by EVONIK
 (a5) Transparent acrylic bead: UNI-POWDER NMB-0320C (average particle size: 3 μm), manufactured by JX Nippon Oil and Energy Corporation (ENEOS Corporation)
 (a6) Black acrylic bead: RUBCOULEUR224SMD black (average particle size: 3 μm), manufactured by Dainichiseika Color & Chemicals Mfg. Co., Ltd.
 (b) Particle 2
 (b1) MHI black_#273_ (average particle size: 150 nm), manufactured by MIKUNI COLOR LID
 (c) Curing agent
 (c1) Trimethylolpropane adduct of benzene dimethyl diisocyanate: TAKENATE D110N, manufactured by Mitsui Chemical Inc.
 (d) Resin
 (d1) Acrylic resin: Acrydic A801, manufactured by DIC Corporation
 (e) Solvent
 (e1) Butyl acetate Examples 1 to 17, Comparative Examples 1 to 5

Add each composition of the light shielding layer into butyl acetate at the solid composition ratio shown in Table 1-3 to make the total solid composition about 25% by mass, and stir and mix to obtain the coating solution. The polyimide substrate film is used to coat a surface with various coating solutions, and then dried at 100° C. for 2 minutes to form a light shielding layer.

Tables 1, 2 and 3 show the results obtained by measuring the average film thickness of the light shielding layer of each sample, Rz value and Rsm value of the light shielding layer surface, the glossiness for the incident light with an incidence angle of 60°, optical concentration, L value, and the reflectivity of the light with a wavelength of 550 nm by the above method; and the results of glossiness, optical concentration, L value and reflectivity of light with a wavelength of 550 nm expressed by the above evaluation standard.

Table 1 shows the evaluation results obtained by setting particle 2 as carbon black with an average particle size of 150 nm, fixing the addition amount as 15 parts by mass, and using silica particles with different average particle sizes as particle 1 to form a light shielding layer. In example 1, example 2 and example 3, composite silica with an average particle size of 3 μm is used as particle 1, but the coating conditions are controlled and the film thickness of the light shielding layer is changed. The Rz of the light shielding layers of example 1, example 2 and example 3 are 3.35 μm, 2.98 μm and 2.92 μm respectively. The Rsm of the light shielding layers of example 1, example 2 and example 3 are 34.99 μm, 32.99 μm and 36.52 μm respectively.

It is confirmed that in example 1, example 2 and example 3, the glossiness at 60° is very low, both 0.5%, and the optical concentration is greater than 2, which can achieve low glossiness and high optical concentration. It can be further seen that the L value of example 1, example 2 and example 3 is low, about 17, and the reflectivity is below 3%, with high blackness and low reflectivity. According to the above results, it is confirmed that low gloss, high optical concentration, low reflectance and excellent blackness can be achieved even if the average film thickness of the light shielding layer is reduced to 3~5 μm in the light shielding component of the invention where the Rz of the light shielding layer is set to 1 μm or more and 5 μm or less and the Rsm is set to 40 μm or less.

TABLE 1

| | | | Example 1 | Example 2 | Example 3 | comparative example 1 | comparative example 2 | Example 4 | comparative example 3 | reference example 1 | reference example 2 | reference example 3 |
|---|---|---|---|---|---|---|---|---|---|---|---|---|
| Composition | Particle1 | (a1)Composite silica(3 μm) | 40 | 40 | 40 | — | — | — | — | — | — | — |
| | | (a2)Transparent silica(58 nm) | — | — | — | 40 | 50 | — | — | — | — | — |
| | | (a3)Transparent silica(4.1 μm) | — | — | — | — | — | 40 | — | — | — | — |
| | | (a4)Transparent silica(6.3 μm) | — | — | — | — | — | — | 40 | — | — | — |
| | Particle2 | (b1)Carbon black(150 nm) | 15 | 15 | 15 | 15 | 15 | 15 | 15 | — | — | — |
| | Binder composition | (c)Isocyanate curing agent | 32 | 32 | 32 | 32 | 32 | 32 | 32 | — | — | — |
| | | (d)Resin | 68 | 68 | 68 | 68 | 68 | 68 | 68 | — | — | — |
| | Total | | 155 | 155 | 155 | 155 | 165 | 155 | 155 | — | — | — |
| | Particle/light shielding layer(volume %) | | 35.48 | 35.48 | 35.48 | 35.48 | 40.88 | 35.48 | 35.48 | — | — | — |
| Evaluation results | Average film thickness(μm) | | 3.3 | 4.5 | 4.8 | 3.5 | 4.3 | 5.0 | 5.1 | 9 | 9 | 9 |
| | Rz(μm) | | 3.35 | 2.98 | 2.92 | 0.63 | 0.66 | 4.57 | 7.23 | 4.05 | 4.05 | 4.61 |
| | Rsm(μm) | | 34.99 | 32.99 | 36.52 | 59.98 | 81.64 | 34.71 | 45.20 | 68.66 | 67.74 | 66.02 |
| | Measured value | Gloss 60°(%) | 0.5 | 0.5 | 0.5 | 19.8 | 18.5 | 0.3 | 0.3 | 2.7 | 2.2 | 3 |
| | | Optical concentration | 2.15 | 2.77 | 3.08 | 3.48 | 3.27 | 1.60 | 1.45 | 3.6 | 3.6 | 5.04 |
| | | L* | 17.27 | 17.39 | 17.43 | 20.51 | 20.51 | 17.61 | 21.3 | 24.11 | 24.39 | 23.93 |
| | | Reflectivity(550 nm)(%) | 2.35 | 2.37 | 2.38 | 3.15 | 3.15 | 2.42 | 3.34 | 5.11 | 4.90 | 4.84 |
| | Evaluation standards | Gloss 60° evaluation | ◎ | ◎ | ◎ | X | X | ◎ | ◎ | X | X | X |
| | | Optical concentration evaluation | ◎ | ◎ | ◎ | ◎ | ◎ | ○ | X | ◎ | ◎ | ◎ |
| | | Blackness evaluation | ◎ | ◎ | ◎ | ○ | ○ | ◎ | ○ | X | X | X |
| | | Reflectivity(550 nm) evaluation | ◎ | ◎ | ◎ | ○ | ○ | ◎ | ○ | X | X | X |

Evaluation standards

Gloss 60° ◎: less than 1%, ○: 1% or more and less than 2% X: 2% or more

Optical concentration ◎: 2 or more, ○: 1.5 or more and less than 2% X: Less than 1.5

Blackness ◎: 18 or less, ○: above 18 and 22 or less X: More than 22

Reflectivity ◎: 3% or less, ○: more than 3% and 4% or less X: More than 4%

Other than using transparent silica with an average particle size of 58 nm as particle 1, the coating solution is prepared and the light shielding layer is formed in the same way as in examples 1-3, which is used as comparative example 1. The Rz of the obtained light shielding layer is smaller, is 0.63 μm, the Rsm is 59.98 μm. It is confirmed that in comparative example 1, the glossiness is very high, is 19.8%, and low glossiness cannot be obtained through this composition.

In comparative example 2, other than changing the composition ratio of particle 1 from 40 parts by mass to 50 parts by mass, the coating solution is prepared as in comparative example 1 and a light shielding layer is formed. In comparative example 2, the Rz of the obtained light shielding layer is also smaller, is 0.66 μm, the Rsm is 81.64 μm, a larger value is displayed compared with comparative example 1. Furthermore, it is confirmed that in comparative example 2, the glossiness is also higher, is 18.5%, and low glossiness cannot be obtained.

It can be seen that in example 4 where transparent silica with an average particle size of 4.1 μm is used as particle 1, the Rsm is 34.71 μm to the same degree as example 1 to example 3, but the Rz is 4.57 μm, greater than 4 μm. In example 4, the glossiness, reflectivity and blackness show performance equal to or above that of examples 1 to 3, but the optical concentration is 1.60, lower than that in examples 1 to 3.

It is confirmed that in comparative example 3 using transparent silica with an average particle size of 6.3 μm as particle 1, the Rz is 7.23 μm, greater than 5 μm, and the Rsm is 45.20 μm. It can be seen from this that the glossiness of comparative example 3 is 0.3%, and low gloss is obtained, but the optical concentration is low, is 1.45, and high optical concentration cannot be obtained. In addition, in comparative example 3, although the required value of the invention is met, the L value and reflectivity are higher than those in examples 1 to 3.

Reference examples 1, 2 and 3 are the existing light shielding components having a light shielding layer on the substrate film, respectively. The Rz of reference examples 1, 2 and 3 are 4.05 μm, 4.05 μm and 4.61 μm respectively, the Rsm is 68.66 μm, 67.74 μm and 66.02 μm respectively. It can be seen that in reference examples 1, 2 and 3, the film thickness of the light shielding layer is 9 μm, however, the glossiness is 2.7%, 2.2% and 3.0% respectively, which does not meet the requirements of the invention. In addition, the L values are 24.11, 24.39 and 23.93 respectively, and the reflectivity is 5.11, 4.90 and 4.84 respectively, the blackness and reflectivity do not meet the requirements of the invention.

According to the above results, it is confirmed that the light shielding component of the invention prepared by setting the Rz of the surface of the light shielding layer to be 1 μm or more and 5 μm or less, and the Rsm to be 40 μm or less, can achieve lower gloss and higher optical concentration than the existing light shielding component even if it is set to be thinner film than the existing light shielding layer. In addition, it is also confirmed that in the present invention, even if it is a thin film, it can achieve lower reflectivity and higher blackness than the existing light shielding components. The Rz is preferably 4 μm or less.

It is further confirmed that in order to obtain the light shielding component of the invention with the above surface structures, it is effective to make the light shielding layer contain large particles and small particles in combination. It is considered that it is effective to set the particle size of large particle 1 as 10~40 times that of small particle 2.

Table 2 shows the results obtained by the above method for measuring the Rz, Rsm, glossiness at 60° incidence angle, optical concentration, L value and reflectance of light with wavelength of 550 nm by using composite silica, acrylic beads or black acrylic beads with an average particle size of 3 μm as particle 1 on the surface of the light shielding layer formed through various conditions. The results of example 1, example 2 and example 3 are also shown.

Evaluate the light shielding layer formed by coating solution under various conditions, these coating solutions are prepared by adding 30 parts by mass (examples 5, 6, and 7), 40 parts by mass (examples 1, 2, and 3), and 50 parts by mass (examples 8, 9, and 10) of composite silica with an average particle size of 3 μm as particle 1. These results confirm that in all examples, the Rz is 1 μm or more and 5 μm or less, and the Rsm is 40 μm or less. Furthermore, it is confirmed that low gloss, high optical concentration, low reflectance, and high blackness are obtained in all examples of the light shielding layers with thin films with average film thickness of 3 μm~5 μm. In addition, it is observed that by increasing the amount of particle 1, the glossiness, reflectivity and L value further decreased, and the optical concentration is tended to increase.

TABLE 2

| | | | Example 5 | Example 6 | Example 7 | Example 1 | Example 2 | Example 3 | Example 8 | Example 9 |
|---|---|---|---|---|---|---|---|---|---|---|
| Composition | Particle 1 | (a1)Composite silica(3 μm) | 30 | 30 | 30 | 40 | 40 | 40 | 50 | 50 |
| | | (a5)Acrylic bead(3 μm) | — | — | — | — | — | — | — | — |
| | | (a6)Black acrylic bead (3 μm) | — | — | — | — | — | — | — | — |
| | Particle 2 | (b1)Carbon black(150 nm) | 15 | 15 | 15 | 15 | 15 | 15 | 15 | 15 |
| | Binder composition | (c)Isocyanate curing agent | 32 | 32 | 32 | 32 | 32 | 32 | 32 | 32 |
| | | (d)Resin | 68 | 68 | 68 | 68 | 68 | 68 | 68 | 68 |
| | Total | | 145 | 145 | 145 | 155 | 155 | 155 | 165 | 165 |
| | Particle/light shielding layer(volume %) | | 30.97 | 30.97 | 30.97 | 35.48 | 35.48 | 35.48 | 39.39 | 39.39 |

TABLE 2-continued

| | | | | | | | | | | |
|---|---|---|---|---|---|---|---|---|---|---|
| Evaluation results | Average film thickness(μm) | | | 3.5 | 4.2 | 4.7 | 3.3 | 4.5 | 4.8 | 4.1 | 4.9 |
| | Rz(μm) | | | 3.34 | 3.46 | 3.13 | 3.35 | 2.98 | 2.92 | 3.28 | 2.92 |
| | Rsm(μm) | | | 35.62 | 35.12 | 35.72 | 34.99 | 32.99 | 36.52 | 34.11 | 32.51 |
| | Measured value | Gloss60°(%) | | 0.9 | 0.8 | 0.8 | 0.5 | 0.5 | 0.5 | 0.4 | 0.5 |
| | | Optical concentration | | 2.01 | 2.55 | 2.87 | 2.15 | 2.77 | 3.08 | 2.36 | 2.91 |
| | | L* | | 18.91 | 18.83 | 18.51 | 17.27 | 17.39 | 17.43 | 17.19 | 17.11 |
| | | Reflectivity(550 nm) (%) | | 2.68 | 2.64 | 2.59 | 2.35 | 2.37 | 2.38 | 2.29 | 2.28 |
| | Evaluation standards | Gloss60° evaluation | | ◎ | ◎ | ◎ | ◎ | ◎ | ◎ | ◎ | ◎ |
| | | Optical concentration evaluation | | ◎ | ◎ | ◎ | ◎ | ◎ | ◎ | ◎ | ◎ |
| | | Blackness evaluation | | ○ | ○ | ○ | ◎ | ◎ | ◎ | ◎ | ◎ |
| | | Reflectivity (550 nm) evaluation | | ◎ | ◎ | ◎ | ◎ | ◎ | ◎ | ◎ | ◎ |

| | | | Example 10 | comparative example 4 | Example 11 | Example 12 | Example 13 | comparative example 5 | Example 14 |
|---|---|---|---|---|---|---|---|---|---|
| Composition | Particle 1 | (a1)Composite silica(3 μm) | 50 | — | — | — | — | — | — |
| | | (a5)Acrylic bead(3 μm) | — | 40 | 40 | 50 | 50 | — | — |
| | | (a6)Black acrylic bead (3 μm) | — | — | — | — | — | 40 | 90 |
| | Particle 2 | (b1)Carbon black(150 nm) | 15 | 15 | 15 | 15 | 15 | 15 | 15 |
| | Binder composition | (c)Isocyanate curing agent | 32 | 32 | 32 | 32 | 32 | 68 | 68 |
| | | (d)Resin | 68 | 68 | 68 | 68 | 68 | 32 | 32 |
| | Total | | 165 | 155 | 155 | 165 | 165 | 155 | 205 |
| | Particle/light shielding layer(volume %) | | 39.39 | 35.49 | 35.49 | 39.39 | 39.39 | 42.31 | 51.22 |
| Evaluation results | Average film thickness(μm) | | 5.1 | 4.3 | 4.8 | 5.0 | 5.7 | 4.4 | 5.9 |
| | Rz(μm) | | 2.88 | 3.26 | 2.83 | 2.90 | 3.25 | 3.25 | 3.87 |
| | Rsm(μm) | | 37.08 | 45.79 | 38.46 | 25.35 | 34.22 | 52.74 | 40.00 |
| | Measured value | Gloss60°(%) | 0.5 | 2.2 | 1.9 | 1.5 | 1.5 | 6.5 | 1.3 |
| | | Optical concentration | 3.35 | 1.75 | 2.11 | 2.03 | 2.29 | 2.67 | 3.08 |
| | | L* | 16.97 | 22.00 | 21.99 | 20.66 | 20.62 | 23.53 | 23.85 |
| | | Reflectivity(550 nm) (%) | 2.32 | 3.49 | 3.46 | 3.15 | 3.13 | 3.96 | 3.98 |
| | Evaluation standards | Gloss60° evaluation | ◎ | X | ○ | ○ | ○ | X | ○ |
| | | Optical concentration evaluation | ◎ | ○ | ◎ | ◎ | ◎ | ◎ | ◎ |
| | | Blackness evaluation | ◎ | ○ | ○ | ○ | ○ | X | X |
| | | Reflectivity (550 nm) evaluation | ◎ | ○ | ○ | ○ | ○ | ○ | ○ |

Evaluation standards
Gloss 60° ◎: less than 1%, ○: 1% or more and less than 2% X: 2% or more
Optical concentration ◎: 2 or more, ○: 1.5 or mor and less than 2% X: Less than 1.5
Blackness ◎: 18 or less, ○: above 18 and 22 or less X: More than 22
Reflectivity ◎: 3% or less, ○: more than 3% and 4% or less X: More than 4%

It is confirmed that in comparative example 4, acrylic beads with an average particle size of 3 μm are used, the Rz is 3.26 μm, but the Rsm is 45.79 μm, greater than 40 μm. In comparative example 4, the glossiness is 2.2%, so the low glossiness required by the invention cannot be obtained.

In contrast, in example 11, which uses the same coating solution as comparative example 4 and changes the coating conditions, the Rz is 2.83 μm, the Rsm is 38.46 μm, and the glossiness is 1.9%, and low glossiness is obtained. It has been confirmed that low gloss and high optical concentration can be achieved by changing the type of particles in the range of the Rz 1 μm or more and 5 μm or less, and the Rsm 40 μm or less. It is confirmed that in example 11, both reflectivity and blackness meet the requirements of the invention, and low reflectivity and high blackness can also be obtained.

In examples 12 and 13, the addition amount of acrylic bead is increased to 50 parts by mass, the coating solution is prepared, and the coating conditions are changed to form the light shielding layer. The Rz of examples 12 and 13 is 2.90 μm and 3.25 μm, and the Rsm is 25.35 μm and 34.22 μm. Furthermore, it is confirmed that low gloss, high optical concentration, low reflectivity and high blackness can be obtained in examples 12 and 13.

In comparative example 5, where the black acrylic beads with an average particle size of 3 μm and 40 parts by mass are added, the Rz is 3.25 μm, but the Rsm is 52.74 μm. In comparative example 5, the glossiness is 6.5%, and low glossiness cannot be obtained.

In contrast, in example 14, where the addition amount of black acrylic bead is increased to 90 parts by mass, the Rz is 3.87 μm, and the Rsm is 40.00 μm. It is confirmed that in example 14, the glossiness is 1.3% and the optical concentration is 3.08. By controlling the Rz and Rsm within the specified ranges of the invention, even if black acrylic bead is used as particle 1, low gloss and high optical concentration can be achieved. In addition, it is confirmed that in example 14, although the reflectance is low, but the L value is 23.85, and the blackness does not meet the requirements of the invention.

It can be seen from the above results that even if the material of particle 1 is set as acrylic resin, by controlling the Rz and Rsm on the surface of the light shielding layer, the light shielding layer of the film can achieve low gloss and high optical concentration. However, in the same degree of film thickness, the Rz and Rsm, it is observed that a tendency to lower gloss in examples using composite silica compared to examples using acrylic beads or black acrylic beads. It can be further known that in the example where composite silica is used, it is easy to obtain the light shielding component with low reflectivity and high blackness. Therefore, the particle 1 is preferably silica.

particle size of 150 nm). The results of example 1, example 2 and example 3 are also shown. The addition amounts of particle 2 for examples 15, 1-3, 16, and 17 respectively are set as 6 parts by mass, 15 parts by mass, 24 parts by mass, and 48.5 parts by mass.

It is confirmed that in all examples, the Rz of the surface of the light shielding layer is 1 μm or more and 5 μm or less, and the Rsm is 40 μm or less, the film thickness of the light shielding layer is 3 μm~6 μm, achieving low gloss, high optical concentration, low reflectivity and high blackness.

In addition, it is observed that if the addition amount of particle 2 is increased, the Rz and Rsm both decrease. It is believed that this is because by adding particle 2, the valley formed between large particles is buried by small particles, the depth of valley becomes shallow, and the distance between valleys becomes shorter.

In addition, it is confirmed that the glossiness, optical concentration, L value and reflectivity increase by adding particle 2.

In the present invention, the Rz and Rsm can be controlled, glossiness, optical concentration, reflectivity and blackness can be adjusted through the content of particle groups, particle sizes of large particle groups and small particle groups, addition ratio, etc. in the light shielding layer, therefore, the light shielding components with required performance can be properly provided.

TABLE 3

| | | | Example 15 | Example 1 | Example 2 | Example 3 | Example 16 | Example 17 |
|---|---|---|---|---|---|---|---|---|
| Composition | Particle 1 | (a1)Composite silica(3 μm) | 40 | 40 | 40 | 40 | 40 | 40 |
| | Particle 2 | (b1)Carbon black(150 nm) | 6 | 15 | 15 | 15 | 24 | 48.5 |
| | Binder composition | (c)Isocyanate curing agent | 32 | 32 | 32 | 32 | 32 | 32 |
| | | (d)Resin | 68 | 68 | 68 | 68 | 68 | 68 |
| | Total | | 146 | 155 | 155 | 155 | 164 | 189 |
| | Particle/light shielding layer(volume %) | | 31.50 | 35.48 | 35.48 | 35.48 | 39.02 | 46.95 |
| Evaluation results | Average film thickness(μm) | | 5.8 | 3.3 | 4.5 | 4.8 | 4.8 | 4.5 |
| | Rz(μm) | | 3.63 | 3.35 | 2.98 | 2.92 | 2.52 | 1.30 |
| | Rsm(μm) | | 35.10 | 34.99 | 32.99 | 36.52 | 33.05 | 21.50 |
| | Measured value | Gloss 60°(%) | 0.3 | 0.5 | 0.5 | 0.5 | 0.8 | 1.7 |
| | | Optical concentration | 2.12 | 2.15 | 2.77 | 3.08 | 3.45 | 4.26 |
| | | L* | 17.66 | 17.27 | 17.39 | 17.43 | 17.88 | 18.67 |
| | | Reflectivity(550 nm)(%) | 2.44 | 2.35 | 2.37 | 2.38 | 2.44 | 2.76 |
| | Evaluation standards | Gloss 60° evaluation | ◎ | ◎ | ◎ | ◎ | ◎ | ○ |
| | | Optical concentration evaluation | ◎ | ◎ | ◎ | ◎ | ◎ | ◎ |
| | | Blackness evaluation | ◎ | ◎ | ◎ | ◎ | ◎ | ○ |
| | | Reflectivity(550 nm) evaluation | ◎ | ◎ | ◎ | ◎ | ◎ | ◎ |

Evaluation standards
Gloss 60° ◎: less than 1%, ○: 1% or more and less than 2% X: 2% or less
Optical concentration ◎: 2 or more, ○: 1.5 or more and less than 2% X: Less than 1.5
Blackness ◎: 18 or less, ○: above 18 and 22 or less X: More than 22
Reflectivity ◎: 3% or less, ○: more than 3% and 4% or less X: More than 4%

Table 3 shows the results obtained by evaluating the light shielding layer obtained from the coating solution, the coating solution is prepared by using composite silica with an average particle size of 3 μm as particle 1, fixing the addition amount to 40 parts by mass, and changing the addition amount of particle 2 (carbon black with an average

The invention claimed is:

1. A light shielding component, comprising: a substrate film; and a light shielding layer formed on at least one surface of the substrate film, wherein a maximum height Rz measured according to JIS B0601: 2001 on an outermost surface forming a surface of the light shielding layer is 1 μm or more and 5 μm or less, and an average length Rsm of contour curve elements is 10 μm or more and 40 μm or less, an average film thickness of the light shielding layer is 2 μm or more and 20 μm or less, the light shielding layer contains inorganic particles of 20 vol. % to 50 vol. % relative to 100 vol. % of the light shielding layer as a whole, the light shielding layer comprises a plurality of inorganic particle groups with different particle sizes, and the inorganic particle group with the largest particle size among the inorganic particle groups is a silica particle group containing silica particles.

2. The light shielding component according to claim 1, wherein the inorganic particle groups include an inorganic particle group with a particle size of 2 μm~6 μm and a particle group with a particle size of 0.06 μm~0.4 μm.

3. The light shielding component according to claim 1, wherein the surface of the light shielding component forming the light shielding layer has a glossiness less than 2% for the incident light with an incident angle of 60°, and an optical concentration is 1.5 or more.

4. The light shielding component according to claim 1, wherein the L value of the surface of the light shielding component forming the light shielding layer is 22 or less.

5. The light shielding component according to claim 1, wherein the surface of the light shielding component forming the light shielding layer has a reflectance for the light with a wavelength of 550 nm is 4% or less.

* * * * *